May 22, 1928.

F. HOLTSCHMIT 1,670,661

DRIVING MECHANISM FOR HOISTS, MOVING STAIRCASES, AND THE LIKE

Filed April 18, 1927

Inventor
F. Holtschmit
by
W. E. Evans
Attorney.

Patented May 22, 1928.

1,670,661

UNITED STATES PATENT OFFICE.

FRIEDRICH HOLTSCHMIT, OF BERLIN, GERMANY.

DRIVING MECHANISM FOR HOISTS, MOVING STAIRCASES, AND THE LIKE.

Application filed April 18, 1927, Serial No. 184,755, and in Germany April 17, 1926.

In driving mechanism for hoists, moving staircases, and the like, it has heretofore been usual to provide the gearing, the driving motors and the brakes as separate constructional parts, the motors being constructed as pedestal motors and the brake as a weight brake actuated by brake magnets. This has the following disadvantages:—

The constructional parts must be mounted separately at the position where they are to be used. A common foundation and much space are necessary. Furthermore not all the rotating parts are encased. The brake, being the highest part of the mechanism, is disposed very high. Where the floors are low, usually in old buildings, this is a great disadvantage. Furthermore in transport to the place of erection the brake magnet and the electrical accessories must be dismantled, by reason of the long distance away of the brake magnet. The mantainance of a stock of materials for maintaining sets of the mechanism is very expensive, because in addition to driving motors adapted to various voltages and kinds of current, corresponding brake magnets also adapted to various voltages and kinds of current must be kept in stock.

The present invention has among its objects to remove these disadvantages by combining the motor, the brake and the gearing to form a constructional unit, an ordinary flange motor being used instead of a pedestal motor, and in place of the brake magnet, the movement of a known axially movable armature is employed for controlling the brake, and furthermore the brake is constructed as a spring brake.

The production in sets of the hoist mechanism is in this way rendered much simpler. For maintaining stock it is only necessary to keep flange motors adapted to the various voltages and kinds of current, and only four or five screws are necessary for applying the motor in position. Adjustment of the machine is rendered unnecessary by reason of circular centering. The highest point of the machine is now the driving motor, so that in transporting the parts of the mechanism considerably smaller cases than heretofore can be employed, which is a consideration of importance especially in transport over sea where freight charges are determined by weight of the goods and also by the space occupied by them. The machine is furthermore of less weight than when constructed as heretofore.

Figure 1:
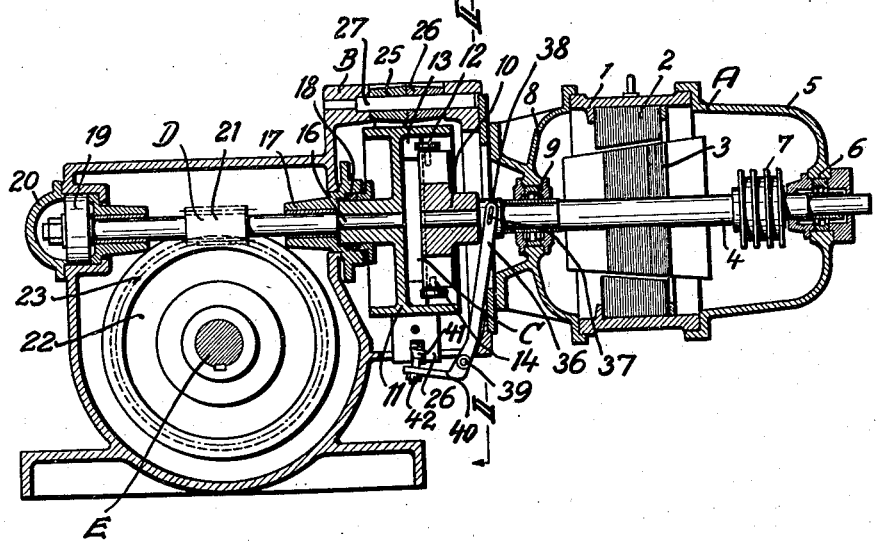
Figure 2:
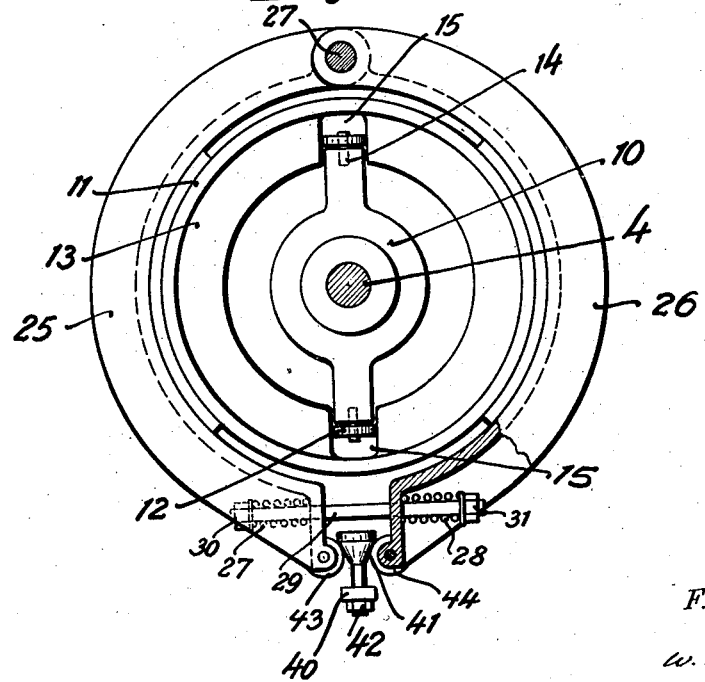

The invention is illustrated by way of example in the accompanying drawings in which Figure 1 is a longitudinal section through the driving mechanism, and Figure 2 is an elevation of the brake and clutch.

The driving mechanism consists mainly of a motor A and the drive casing B, in which casing are provided the clutch C and the worm gear D. The hoisting drum or the driving pulley is provided upon the shaft E of the worm gear.

The motor casing 1 is provided with the conical winding 2 which corresponds to a similar conical rotor winding 3 on the motor shaft 4. This form of winding causes the motor to operate in the manner of a magnetic brake. When it is energized the armature is drawn into the field, while, on interruption of the current, a spring or a weight causes the armature to be forced to the right, into the position illustrated in Figure 1. In the construction illustrated, disengagement of the armature is effected by the brake springs hereinafter referred to. The motor casing 1 has fixed to it the cover plate 5 which supports the bearing 6; within the motor casing are provided the slip rings 7 and the corresponding current collectors and the like. On the left hand side the motor casing has fixed to it the flanged cover plate 8 which supports the bearing 9. By means of the flange of this cover plate the motor is fixed to the casing B. In a forward position upon the motor shaft is keyed a clutch member 10 which engages in a corresponding clutch member 11. The clutch member 10 carries rollers 12 which can run upon the track 13 of the clutch member 11 until they drop into the slots 15. The rollers are mounted upon the clutch member 10 by means of pins 14. The clutch member 11 is mounted upon the drive shaft 16, which is carried in a bearing 17 provided with a stuffing box 18. Upon the other side the shaft 16 is supported by a ball bearing 19, which is enclosed by a cover-plate 20. A worm 21 is provided on the shaft 16 and engages in the teeth 23 of a worm wheel 22. This worm wheel is mounted upon the shaft of the driving wheel or the like. The clutch C also forms part of a brake which comprises two braking jaws 25 and 26 which are suspended from a common pin 27 in the casing B. The braking jaws are pressed together by two springs 27 and 28, which are held upon the pin 29 by means of the nuts 30 and 31. They are released by a device consisting of a lever 36 having a fork-shaped end which engages by means of slots with two pins 37 of a non-rotatable sleeve 38 which moves upon the motor shaft 4. The lever 36 is pivoted about a point 39, and the lower arm 40 of the lever is provided with a spreading cone 41 which is held by a nut 42 or the like. The cone 41 is forced between the rollers 43 and 44 at the ends of the braking jaws 25 and 26 and presses the rollers apart immediately the lever 36 swings to the left and the arm 40 of the lever swings downwardly.

The mechanism operates as follows:—

When current is supplied the axially movable armature 3 with the motor shaft 4 moves into the field. In making this movement it travels to the left and forces the clutch member 10 against the clutch member 11 until the rollers 12 slip into the slots 15. The clutch is thus engaged. At the same time the lever 36 swings to the left, the spreading cone is drawn downwardly, and the braking jaws are forced apart. The shaft 16 is thus caused to rotate and the driving wheel or the like is driven through the worm gear D. When the current is cut off the reverse movements take place.

I claim:—

1. An electrical driving mechanism for hoists, moving staircases and the like, comprising a motor having an axially movable armature and shaft, a casing upon which said motor is mounted, gearing within said casing adapted to be driven by said motor, clutch elements respectively connected to said axially movable motor shaft and said gearing, brake elements applied to one of the elements of the said clutch, the said brake elements and clutch element being contained within said casing, substantially as hereinbefore described.

2. An electrical driving mechanism for hoists, moving staircases and the like, comprising a motor having an axially movable armature and shaft, a casing upon which said motor is mounted, a clutch element within said casing upon said motor shaft, gearing within said casing, a driven shaft co-axial with said motor shaft and carrying an element of the gearing, a clutch element upon said shaft to co-operate with the clutch element upon the motor shaft, pivoted brake elements mounted in said casing and adapted to engage the clutch element upon the gearing shaft, means for exerting pressure upon said brake elements to engage said clutch element and a brake operating member pivoted in said casing and engaging said motor shaft, substantially as hereinbefore described.

3. An electrical driving mechanism for hoists, moving staircases and the like, comprising a motor having an axially movable motor shaft and an armature mounted on said shaft, a casing upon which said motor is mounted, a clutch element carried by said shaft within said casing, rollers carried by said clutch element with their axes radially disposed with reference thereto, gearing within said casing, a driven shaft upon which an element of said gearing is mounted, a cylindrcal clutch element upon said gearing shaft embracing the clutch element upon said motor shaft, recesses in said cylindrical clutch element for the reception of the said rollers, brake elements pivoted within said casing for engagement with said cylindrical clutch element, springs mounted upon said brake elements to engage them with said clutch element, a brake operating member pivoted in said casing, and a brake operating wedge carried by said operating member, said operating member being connected to said motor shaft, substantially as hereinbefore described.

4. Driving mechanism for hoists and the like comprising an electric motor, gearing, a clutch for connecting the motor with the gearing, a brake, a brake lever, a spring normally pressing said brake into engagement with one member of the clutch, said motor comprising an armature and shaft movable axially by the attraction of the motor field when the motor is energized and adapted, during such movement, to engage the clutch members and operate the brake lever to release the brake, and said spring adapted to reset the brake and move the armature shaft axially to disengage the clutch when the motor is de-energized.

FRIEDRICH HOLTSCHMIT.